July 19, 1966  P. P. RUMINSKY  3,261,386
CONTINUOUS SCREW STRIP TOOL
Filed Sept. 10, 1964  3 Sheets-Sheet 1

INVENTOR
PAUL P. RUMINSKY
BY Semmes & Semmes
ATTORNEYS

July 19, 1966 P. P. RUMINSKY 3,261,386
CONTINUOUS SCREW STRIP TOOL
Filed Sept. 10, 1964 3 Sheets-Sheet 2

INVENTOR
PAUL P. RUMINSKY
BY Semmes & Semmes
ATTORNEYS

United States Patent Office 3,261,386
Patented July 19, 1966

3,261,386
CONTINUOUS SCREW STRIP TOOL
Paul P. Ruminsky, Amherst, Ohio, assignor of one-half to Herbert C. Brauchla, Fremont, Ohio
Filed Sept. 10, 1964, Ser. No. 395,388
7 Claims. (Cl. 144—32)

The present application relates to a continuous screw strip tool of the type employed for driving screw strips of the type disclosed in applicant's Patent 3,127,625 entitled Method for Forming Screws, issued April 7, 1964.

This application is a continuation-in-part of applicant's application entitled Screw Strip Driving Gun (Serial No. 391,547), filed August 24, 1964.

In the parent application there was disclosed a portable hand-operated screw strip driving gun. The present application is directed to a more permanent installation, rather a bench operated tool wherein a screw strip embodying several hundreds or thousands of screws in a continuous strip might be bench operated in the manner of a drill-press or the like. Consequently, there are included more elaborate controls for the screw strip advance and driving mechanism and an improved rotary driving mechanism.

Accordingly, it is an object of this invention to provide a continuously operable screw strip driving tool.

Another object of invention is to provide a bench-operable continuous screw strip driving tool.

Yet, additional objects of invention will become apparent from the ensuing specification and attached drawings wherein:

FIG. 4 is a fragmentary perspective of a screw strip of the type driven according to the present invention.

Figure 2:
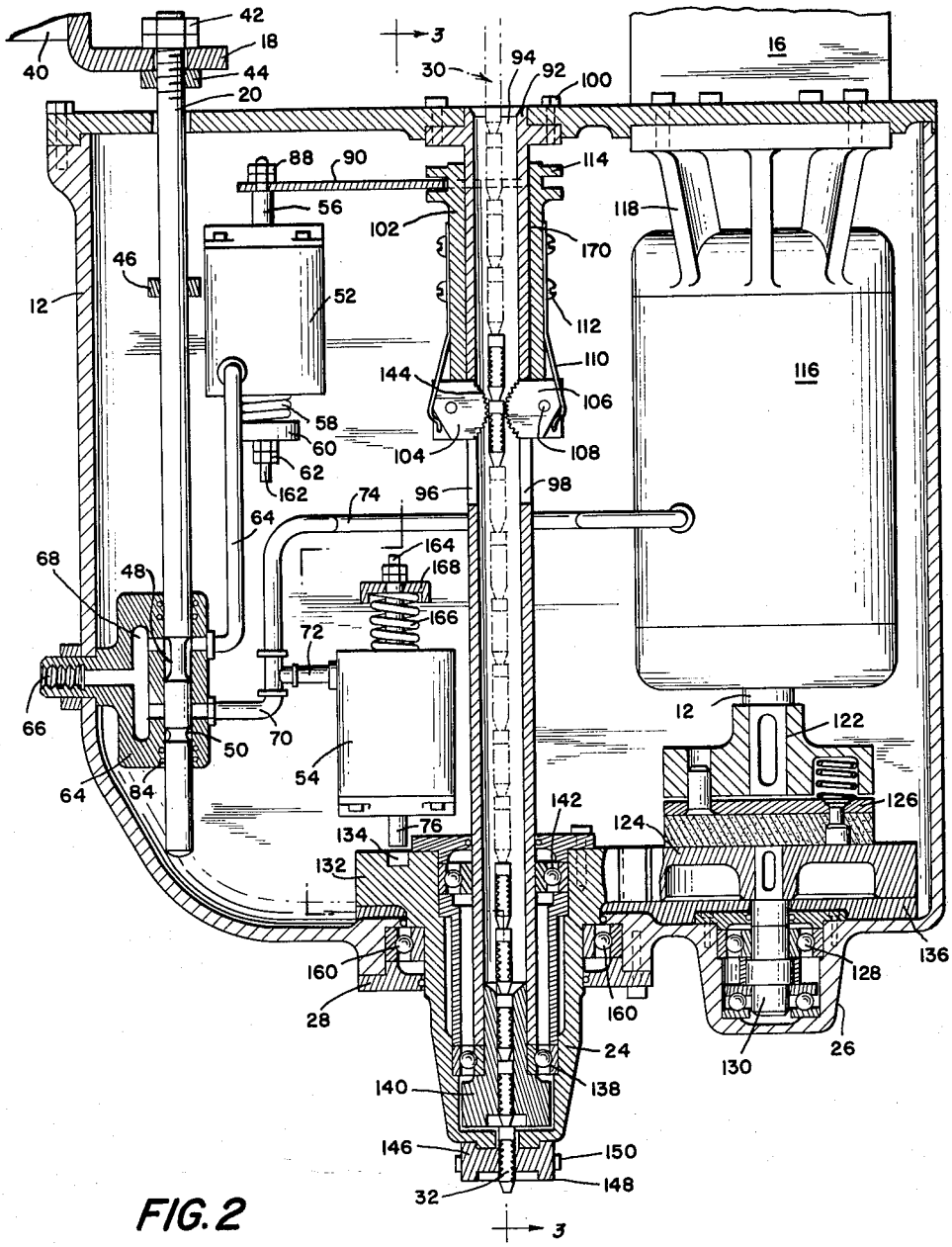
FIG. 2 is a vertical section of the screw strip driving tool, taken along section line 2—2 of FIG. 1.
Figure 3:
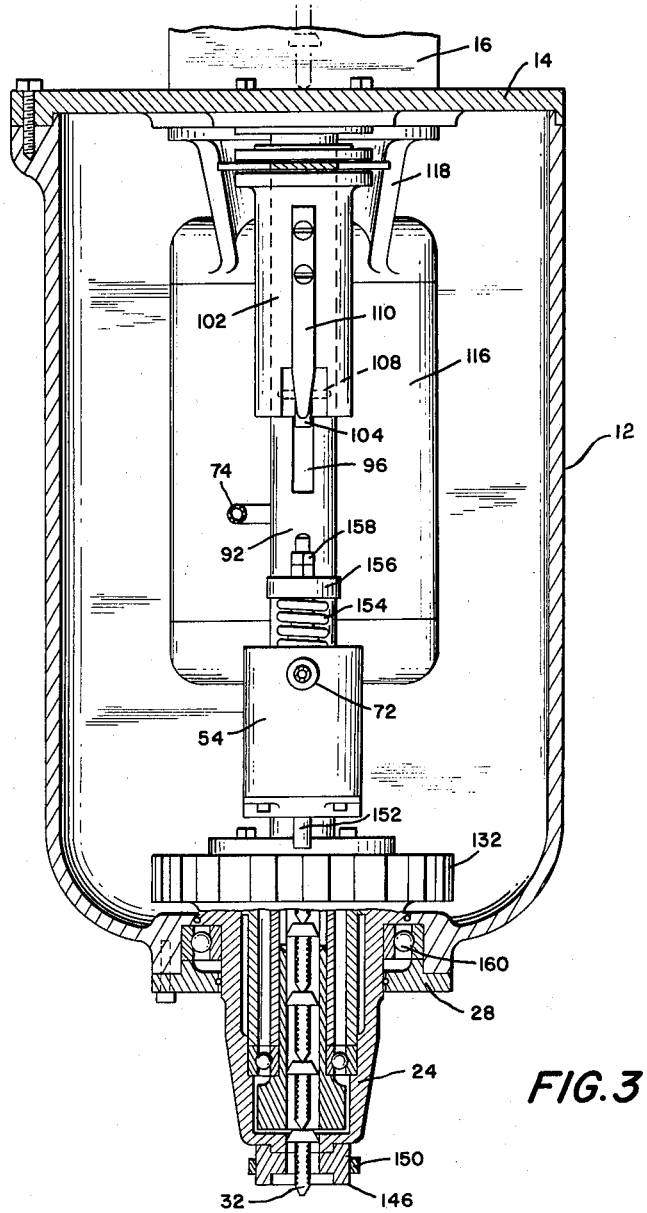
FIG. 3 is a vertical section taken along section line 3—3 of FIG. 2.

As illustrated in FIGS. 2 and 4, a screw strip 30 as contemplated in the present invention could be coiled in a large three foot or larger diameter coil and could be retained on a spool above housing 10 with the lead screw 32 passed down through spindle 92 of housing 12 and extending through rotary driving barrel 24. As disclosed in the parent application, the screw strip embodies a plurality of screws having die-formed threads 38, heads 34 and shear points 36. It is contemplated that the present apparatus could be mounted cooperatively with a screw strip forming mechanism such as disclosed in applicant's Patent 3,127,625 for continuous, uninterrupted forming and driving of screws.

Figure 1:
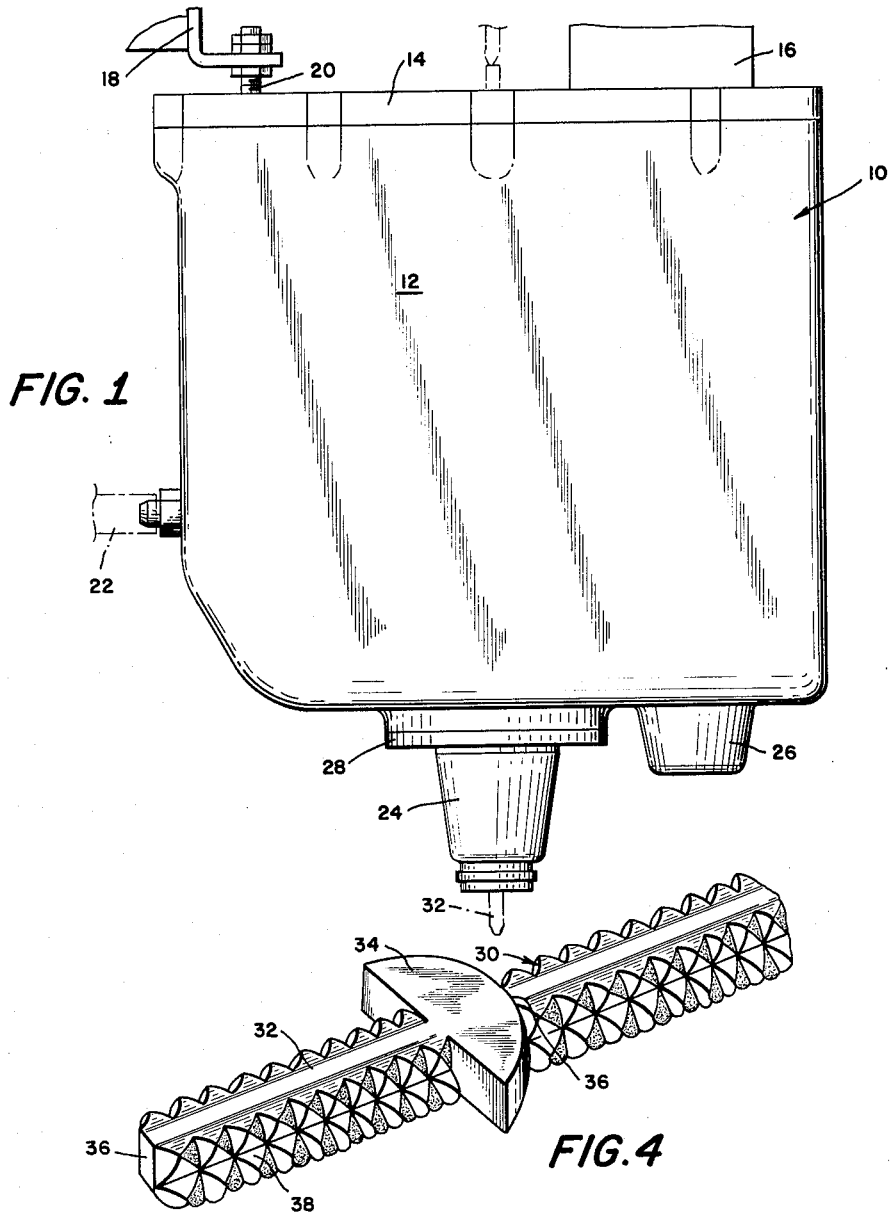
FIG. 1 is a perspective view of the proposed bench-operated screw strip driving tool showing lead screw 32 extending for driving purposes through the bottom of the housing.

In FIG. 1 the screw strip tool 10 is illustrated as comprising housing 12 and upper base plate 14 secured about vertically reciprocable shaft 16, shown fragmentarily. Bracket 18 may be mounted to stationary column or wall piece 40 in order to support threaded air piston 20 by means of bolts 42 and 44. As illustrated in FIG. 2, threaded air piston 20 is supported inwardly of housing 12 by means of guide bushings 46 and has at its lower end reduced diameter valve portions 48 and 50 for controlling respectively the air fed through conduits 64 and 70. Slip rings 84 and 86 may be set in valve 64 at the top and bottom of reduced diameter portions 48 and 50. Screw strip rotatable barrel 24 is secured about stationary spindle 92 having axial bore 94 through which the screw strip 30 extends. Air-driven motor 116 is supported inwardly of base plate 14 by means of bracket 118. As indicated in FIG. 1, a bearing plate 26 may be provided for the rotary driving support of shaft 130 by means of ball bearings 128. Also bearing plate 28 extends about barrel 24 by means of ball bearings 160.

Axial advance solenoid 52 may be mounted upon shaft 162 to which spring 58 and base plate 60 are secured by means of bolts 62. Advance solenoid 52 embodies at its other end axial advance shaft 56 which is secured to advance plate 90 by means of bolts 88. Advance plate 90 in turn is secured to rotary drive barrel 170 principally by means of drive barrel flanges 114. Rotary drive barrel 170 has a pair of cams 104 and 106 having threaded faces 144 mounted at the lower end of barrel 170 by means of pins 108. Identical leaf springs 110 may be secured to barrel 170 by means of set screws 112 or the like and are employed to urge the cams inwardly against screw strip 30. Cams 104 and 106 are urgeable radially inwardly through spindle 92 side apertures 96 and 98. Due to the circular presentation of cam threads 144 with respect to the screw strip threads, the cams exert an increased radially inward locking force upon the screw strip as barrel 170 is actually advanced downwardly.

Air-powered locking solenoid 54 is mounted upon shaft 164 and includes base plate 168 and spring 166 urging lock shaft 76 downwardly in the top face of rotary drive gear 132 index notches 140 set 180° apart.

As illustrated particularly in FIG. 2, locking solenoid 54 is fed by air conduit 72 leading from general supply conduit 70 in turn connected to T connection 68 in valving piece 64. Compressed air is supplied through threaded inlet 66 for both reciprocable advancing solenoid 52 and locking solenoid 54, as well as air-powered motor 116 which is fed by conduit 74. Air-powered motor 116 includes driveshaft 120 extending to clutch face 122. An intervening bonded clutch material 126 is interposed between clutch face 122 and drive gear 124. Drive gear 124 is continuously intermeshed with driven gear 132. Thrust pads 136 may be interposed beneath the housing 12 bottom and gears 132 and 124. Ball bearing assemblies 138 and 142 are mounted about the spindle 92 so that rotatable barrel 24 may be rotated thereabout. Barrel 24 includes hardened guide 140 which extends inwardly of spindle 92 so as to position screw strip 30. At the lower driving end of barrel 24 there are mounted opposed locking jaws 146 and 150 which may be secured inwardly against the screw threads 38 by means of resilient stainless steel band 150.

In operation housing 12 is actuated downwardly by grasping shank 16 mounted reciprocably in a drill-press or similar device which will permit downward travel. Since threaded piston 20 is affixed independently to bracket 18 attached in turn to some stationary member of the press, piston 20 will not be allowed vertical movement. Air is continuously fed to sliding air valve 64 through threaded inlet 66. As housing 12 is advanced downwardly toward the work piece into which the screw will be driven operation commences. At approximately a ⅜ inch travel downward, piston reduced diameter valving portion 48 is brought into alignment with conduit 64, as illustrated in FIG. 2. Air is then fed to air solenoid 52 which travels axially downwardly in the direction of the arrow carrying with it advance plate 90 and feed jaws 104 and 106. This downward movement may be adjusted by bolts 62 so as to advance the screw strip one full screw length, projecting lead screw 32 beyond the driving end of the tool. As the housing continues its downward movement at the ½ inch downward point, piston reduced diameter portion 50 is aligned with conduit 70. Air is then ultimately fed to locking solenoid 54 which retracts its grasp on shaft 76 from notch 134 in rotary driven gear 132. Simultaneously, air is fed through conduit 74 causing air-powered motor 116 to drive gears 124 and 132 which rotates the barrel 24 together with screw strip 30. The lead screw 32 is sheared from the screw strip 30 as its head 34 engages the surface being penetrated. When screw 32 is driven home the torque at which it is driven is controlled by setting of the clutch pressure of the torque clutch 122. Applicant's tool may be contrasted to conventional power screwdrivers wherein the clutch setting is solely determinatives of the torque which can be developed. Applicant's screw strip shear points 36 may be cut or pressed to determine the driving torque which can be developed before shearing of the lead screw. The tool is then released and on the upward stroke of housing 12 air is first cut off from air solenoid 54 and air motor 116, causing shaft 76 to lock into either index 134 slots of gear 132, thus positioning rotary barrel 24 and hardened guide 140. Thus, screw strip 30 is again aligned for advancing and driving. The idling rotation of drive motor 116 is absorbed by the clutch mechanism. Next as housing 12 continues its upward movement, air is cut off from air solenoid 52 which allows it to retreat upward for another grip on a trailing portion of screw strip 30.

As will be apparent screw strips of any length may thus be continuously driven without interruption for re-insertion of the lead screw in spindle 92. Also, it is contemplated that aluminum as well as plastic, tool steel and other types of screw strips might be driven according to the present invention.

Manifestly, various changes in solenoid controls as well as types of driving power may be devised without departing from the spirit and scope of invention, as defined in the subjoined claims.

I claim:
1. A continuous screw strip tool comprising:
  (A) a housing;
  (B) a screw strip spindle with axial bore having a screw strip feeding end and a driving end extending through said housing;
  (C) a rotatable barrel mounted in said housing about the driving end of said spindle;
  (D) a driving means supported in said housing and engaging said rotatable barrel;
  (E) screw guide means mounted within said rotatable barrel in co-axial alignment with said spindle so as to axially support a screw strip of threaded screws in end to end relationship within said spindle and barrel;
  (F) an axially reciprocable screw strip advance sleeve supported about said spindle and including at its driving end a pair of pivoted threaded cams radially extensible through the sides of said spindle so as to engage and lock upon threads of said screw strips upon axial advancement of said locking sleeve;
  (G) trigger means engaging said advance sleeve and said driving means, respectively, for axial advancement then rotary driving of said screw strip upon reciprocation of said housing; and
  (H) lock means connected to said trigger means and engaging said rotary driving means except upon downward thrust of said housing.

2. A continuous screw strip tool as in claim 1, wherein said advance sleeve, said lock means and said rotary driving means are operatively mounted in series so that upon reciprocation of said housing the following sequence occurs: said locking sleeve advances said screw strip axially, then said screw strip is rotatably driven for penetration of said lead screw, then said rotary driving is stopped while said advance sleeve retreats in line and re-engages a trailing portion of said screw strip.

3. A continuous screw strip tool as in claim 2, wherein said trigger means, said advance sleeve, said locking means and said rotary driving means are air-powered.

4. A continuous screw strip tool comprising:
  (A) a housing mounted upon a vertically reciprocable shaft;
  (B) a screw strip spindle with axial bore having a screw strip feeding end and a driving end and extending through the top and bottom of said housing;
  (C) a rotatable barrel supported in said housing about the driving end of said spindle and including a hardened screw guide means supported in co-axial alignment with said spindle and axially supporting a screw strip of threaded screws in end to end relationship;
  (D) a rotary driving means supported in said housing and engaging said rotatable barrel and including adjustable clutch means;
  (E) an axially reciprocable screw strip advance sleeve supported about said spindle and including at its driving end a pair of pivoted threaded cams radially extensible through the sides of said spindle so as to engage and lock upon threads of said screw strip upon axial advancement of said sleeve;
  (F) locking means supported in said housing and engaging said rotary driving means;
  (G) an air-powered motor connected to said rotary driving means and mounted in said housing;
  (H) an air power supply conduit positioned in said housing and extending to said advance sleeve, said locking means and said motor; and
  (I) a valving means intersecting said air supply conduit, so as to regulate supply of air power to said advance sleeve, said locking means and said motor upon vertical reciprocation of said housing.

5. A continuous screw strip tool as in claim 4, including solenoid actuators extending into said air supply conduit intermediate said stationary valving means and both said advance sleeve and said locking means.

6. A continuous screw strip tool as in claim 4, wherein said advance sleeve cams are configured to increase their grip radially inwardly upon said screw strip upon advance of said sleeve toward said spindle driving end.

7. A continuous screw strip tool as in claim, 6, wherein said stationary valving means includes a valving piston fixed independently to an exterior base while extending into said housing so as to intersect the supply of air from said valving means to said solenoid actuators and said motor.

No references cited.

WILLIAM W. DYER, JR., *Primary Examiner.*

R. J. ZLOTNIK, *Assistant Examiner.*